United States Patent [19]
Washino et al.

[11] Patent Number: 5,923,484
[45] Date of Patent: Jul. 13, 1999

[54] METHOD OF CHANGING A THERMOMAGNETIC TAPE DUPLICATOR TO AN ANHYSTERETIC TYPE OF TAPE DUPLICATOR

[75] Inventors: Kinya Washino, Dumont; Masashi Okajima, Bergenfield; David M. Hughes, Wayne, all of N.J.

[73] Assignee: Future Productions, Inc., Mahwah, N.J.

[21] Appl. No.: 08/705,615

[22] Filed: Aug. 30, 1996

Related U.S. Application Data

[60] Provisional application No. 60/003,058, Aug. 31, 1995.

[51] Int. Cl.[6] ........................................................... G11B 5/86
[52] U.S. Cl. ............................... 360/15; 360/17; 360/137
[58] Field of Search ........................... 360/17, 137, 96.5, 360/74.1, 16, 15

[56] References Cited

U.S. PATENT DOCUMENTS

3,777,075  12/1973  Hendershot, III et al. ............... 360/17
4,882,636  11/1989  Billings et al. ........................... 360/16
5,450,247   9/1995  Schwab ..................................... 360/17
5,475,548  12/1995  Rudi et al. .............................. 360/96.5
5,543,973   8/1996  Moriyama ................................. 360/17

*Primary Examiner*—Andrew L. Sniezek
*Attorney, Agent, or Firm*—Gifford, Krass, Groh, Sprinkle, Anderson & Citkowski, PC

[57] ABSTRACT

An improved high speed magnetic tape duplicator incorporates superior features from both thermomagnetic and anhysteretic processes to increase productivity in operating economics. Starting with a basic transport configuration of existing thermomagnetic equipment, the heating and cooling facilities are removed along with the non-magnetic transfer drum, and replaced with a magnetizable drum assembly and bias-field head suitable to anhysteretic duplication. Provisions are also added to correct tension errors so as to minimize skew and the transport control electronics are preferably replaced with a personal computer-based controller capable of furnishing additional functional capabilities including production reporting. Optionally, the master-tape loop-bin chamber is also specially modified with electrically ground static-control provisions.

12 Claims, 6 Drawing Sheets

Figure - 7
*(PHANTOM CONTROL CIRCUIT)*

ABSTRACT

METHOD OF CHANGING A THERMOMAGNETIC TAPE DUPLICATOR TO AN ANHYSTERETIC TYPE OF TAPE DUPLICATOR

REFERENCE TO RELATED APPLICATION

This application claims priority of U.S. provisional application Ser. No. 60/003,058, filed Aug. 31, 1995, the entire contents of which are incorporated herein by reference.

FIELD OF THE INVENTION

The invention relates generally to the field of magnetic recording, and, more particularly, to an improved magnetic tape duplication apparatus.

BACKGROUND OF THE INVENTION

There are two different high-speed duplication methods in common usage in video recording facilities. The first method employs the use of Curie-temperature thermoremanence effects to produce duplicated recordings on bulk pancakes of copy tape from a mirror-image master tape. The second method employs anhysteretic effects to produce copies from a higher-coercivity mirror-master tape. Each system has a number of advantages and drawbacks.

For the thermomagnetic process, the disadvantages are centered around the requirement that $CrO_2$ copy tape be used, which commands a significant price premium in the marketplace, and is available only from a dwindling number of suppliers. The thermomagnetic process also requires the use of a high-powered ND-YAG laser to provide the necessary heating to the copy tape oxide layer. This laser system has significant maintenance costs and consumes large quantities of electricity, thereby generating substantial heat which must be removed by water cooling facilities. In addition, available thermomagnetic duplication equipment utilizes a vertical loop-bin configuration to house the mirror-master tape, and the speed of operation of this unit is limited by static electricity effects, even as the master-program-length is limited by the physical capacity of the loop-bin. The major advantages of the system are the generally excellent tape-handling characteristics, and the high quality of the copies produced.

As for the anhysteretic process, the disadvantages of the currently available duplication equipment are related to the lack of loop-bin facilities in those models utilizing a vertical configuration of the equipment, and in the large amount of floor space required for the loop-bin incorporated in-horizontal configurations. In addition, the use of stationary (non-rotating) tape guides in both of these configurations results in problems due to tape oxide shedding. Furthermore, the price of the horizontal configuration equipment is cost-prohibitive for many duplication companies. Advantages for this type of system include relatively low maintenance and operating costs, and the ability to utilize any type of magnetic tape.

SUMMARY OF THE INVENTION

The subject invention incorporates the best features of both systems, and of both types of equipment, to provide an improved duplication unit incorporating all of the desirable features listed herein above, thereby producing significantly increased productivity and improved operating economics. Starting with the basic transport configuration of the existing thermomagnetic duplication equipment, the unit is modified in a number of respects. The laser heating facilities and related cooling provisions are removed. The transfer mechanism is replaced with a new transfer drum assembly appropriate for magnetic-transfers rather than thermal-transfers; a newly-designed bias-field head, which provides the required transfer-field in a much less complicated configuration than in conventional units supplants the traditional unit utilized in anhysteretic-type duplication equipment. Provisions are added to correct tension errors in the copy tapes (manifested as "skew" error at the top of the resultant picture) by monitoring and controlling the tension of the tapes during the duplication process. The transport control electronics system is preferably replaced with a PC-based microprocessor controller for the modified transport mechanism, adding provisions for various functional controls and for reporting a range of production information. The master-tape loop-bin chamber is also preferably modified to include specially modified, electrically grounded static-control provisions, allowing the tape in the loop-bin to be confined between the deck plate of the transport on one side, and outer conductive-glass bin-confinement doors of the loop-bin chamber on the other side. This modification significantly improves the tape handling characteristics by reducing the effects of static-electricity build-up in the loop-bin chamber, and thereby enables the unit to achieve higher operating speed and productivity.

DETAILED DESCRIPTION OF THE PREFERRED EMBODIMENT

Figure 1:
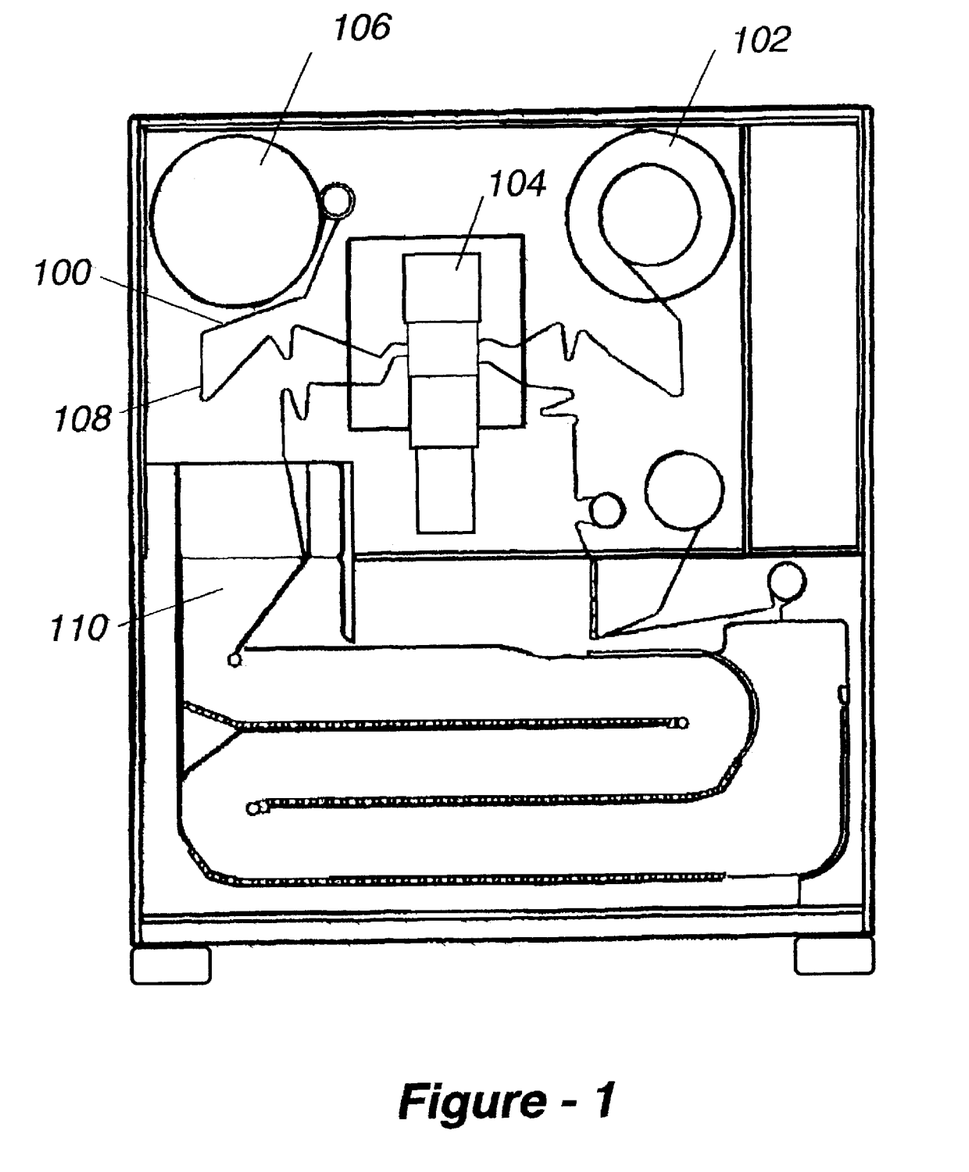
FIG. 1 depicts the tape path in a conventional, unmodified thermal-duplication apparatus.

In order to appreciate the scope of modifications embodied in the subject invention, it is appropriate to consider the existing equipment in light of these improvements. FIG. 1 shows the tape path of a conventional thermoremanent high-speed duplication apparatus. Blank copy tape 100 is conducted from a bulk-pancake supply reel 102, through a heat-transfer mechanism 104 to a tape take-up reel 106. The mirror-master tape 108 is conducted through a heat-transfer mechanism 104 and cycled through the loop bin storage chamber 110.

Figure 2:
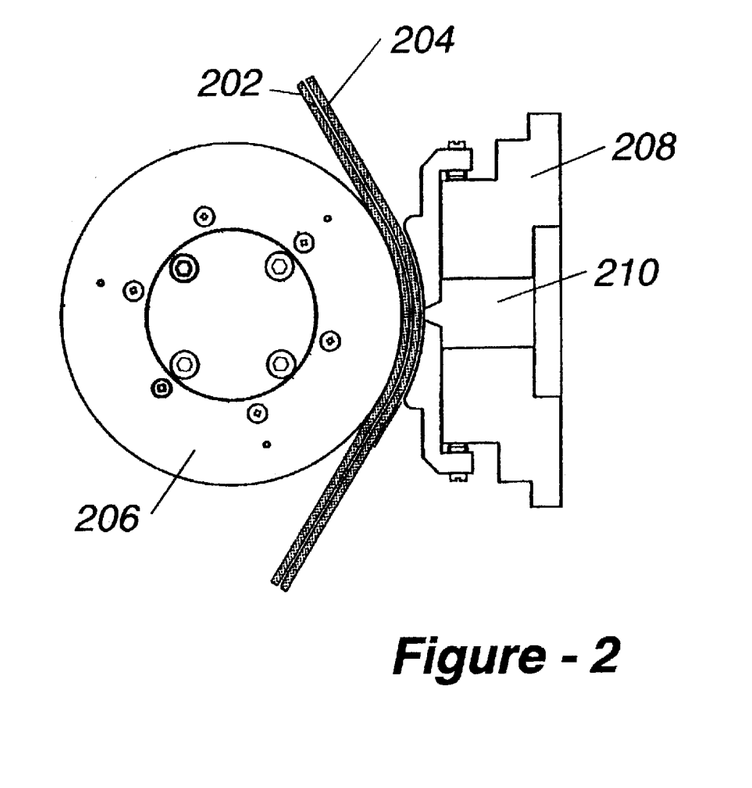
FIG. 2 shows the transfer-drum area detail of the modified duplication apparatus.

FIG. 2 shows a detailed view of the transfer mechanism assembly for a thermoremanent duplicator. Mirror-master tape 202 and blank copy tape 204 are urged against transfer drum 206 by force of air-clamp assembly 208. While held in intimate, slippage-free contact by the air clamp, the oxide coating of the copy tape 204 is heated through the back side by the laser-beam heating system (not shown) through the aperture opening 210.

Figure 3:
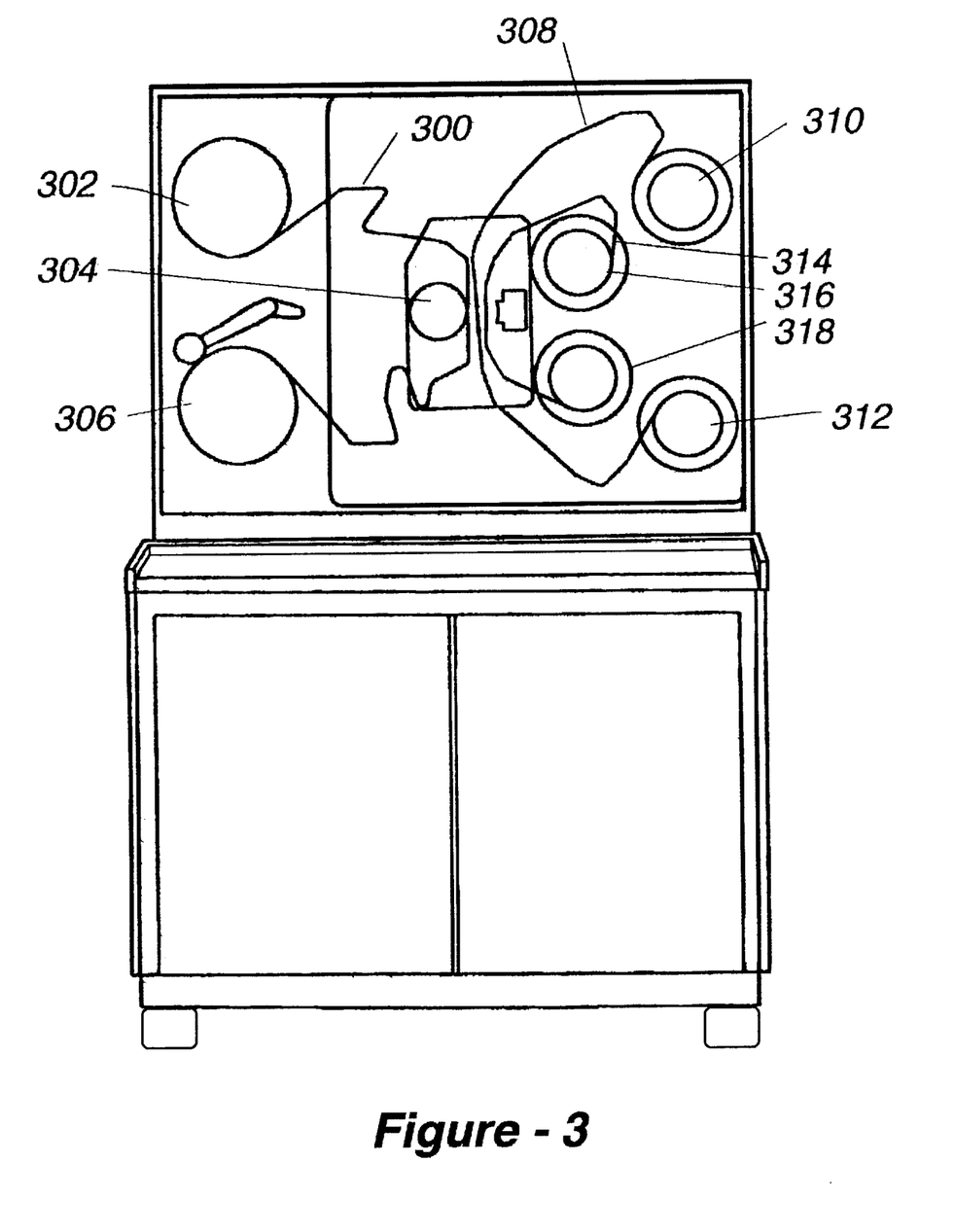
FIG. 3 depicts the tape path in a conventional anhysteretic-duplication apparatus having a vertical tape path configuration.

FIG. 3 shows the tape path of a conventional anhysteretic duplication apparatus having a vertical configuration. Blank copy tape 300 is conducted from a bulk-pancake supply reel 302, through an anhysteretic-transfer mechanism 304 to a tape take-up reel 306. The mirror-master tape 308 is conducted from a supply-reel 310, through the anhysteretic-transfer mechanism 304 and onward to a take up reel 312. In order to improve tape handling through this mechanism, and to ensure intimate, slippage-free contact between the master tape and the copy tape, a third tape is included in tape-transport system. This tape 316, traditionally referred to as a "drive tape," is conducted from supply reel 302; through the anhysteretic-transfer mechanism 304, and on to the take-up reel 318. When performing the duplication operation, the mirror-master tape is transported through the mechanism while the anhysteretic transfer mechanism is energized. As in the case of the thermoremanent duplication apparatus, an air clamp located within the anhysteretic-transfer mechanism is employed to squeeze the three layers of tape together in intimate, slippage-free contact.

Figure 4:
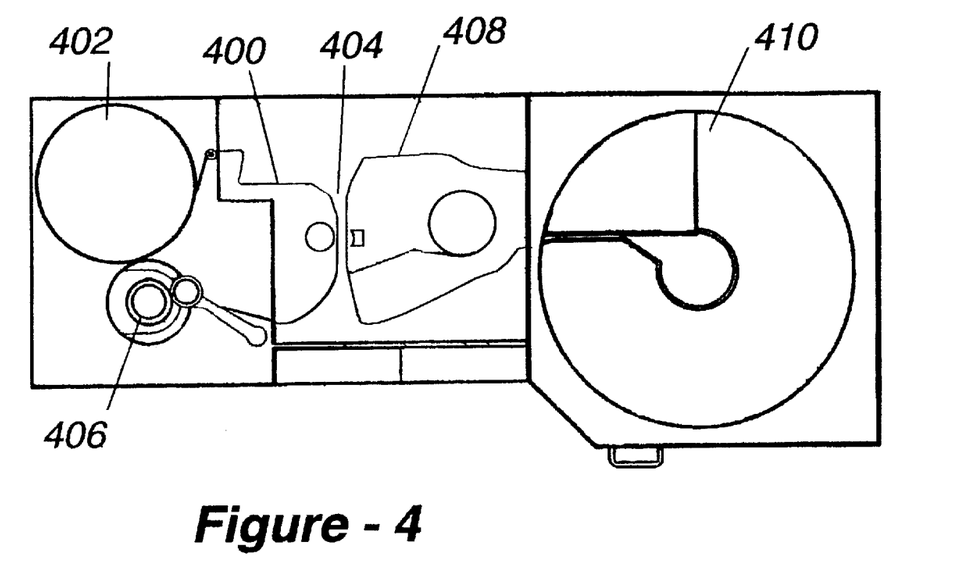
FIG. 4 depicts the tape path in a conventional anhysteretic-duplication apparatus having a horizontal tape path configuration and a loop-bin.

FIG. 4 shows the tape path of a conventional anhysteretic duplication apparatus having a horizontal configuration. Blank copy tape 400 is conducted from a bulk-pancake supply reel 402, through a anhysteretic-transfer mechanism 404 to the tape take-up reel 406. A mirror-master tape 408 is conducted from a loop-bin storage chamber 410, through the anhysteretic-transfer mechanism 404, and then cycled back into the loop-bin 410. As in the case of the thermoremanent duplication apparatus, an air clamp located within the anhysteretic-transfer mechanism is employed to squeeze the two layers of tape together in intimate, slippage-free contact.

Figure 5A:
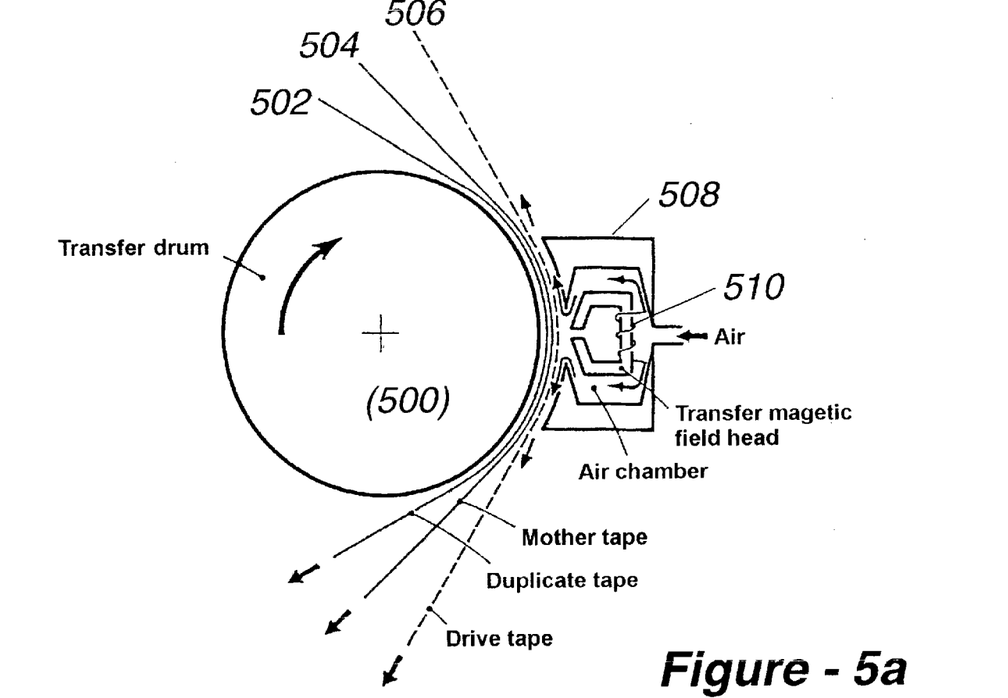
FIGS. 5a and 5b show the transfer-drum area detail for the two versions of the conventional anhysteretic duplicator.
Figure 5B:
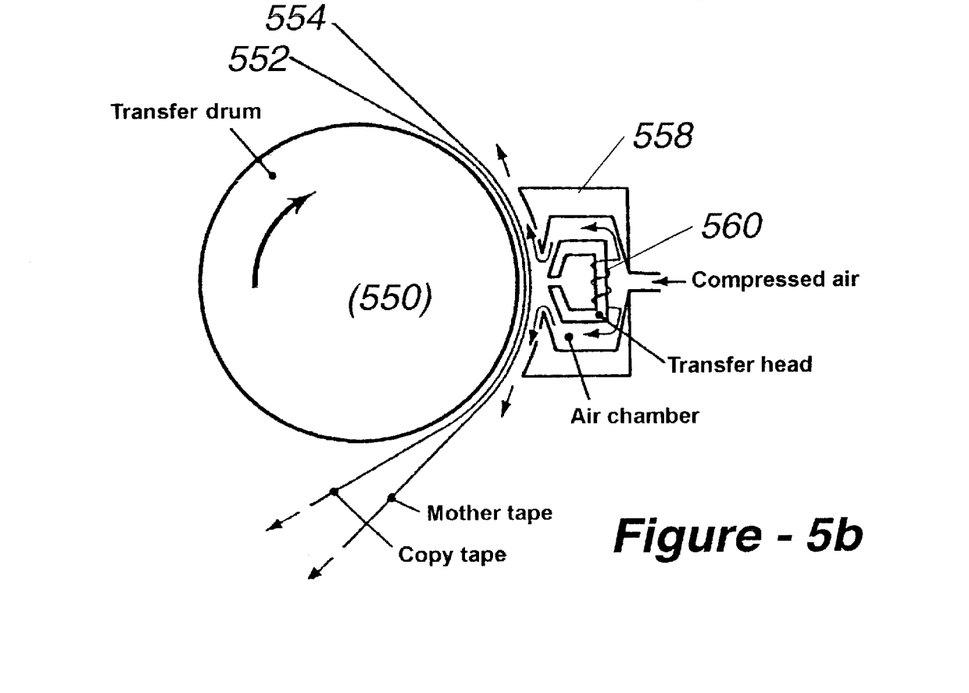

FIGS. 5a and 5b show the details of the anhysteretic transfer mechanisms utilized in the two versions of conventional anhysteretic duplication equipment. In FIG. 5a, which shows the mechanism utilized in conventional duplication equipment having a vertical configuration, blank copy tape 502, mirror-master tape 504, and drive-tape 506 are urged against transfer drum 500 by force of an air-clamp assembly 508. While held in intimate, slippage-free contact by the air clamp, the layers of tape are exposed to the anhysteretic transfer field from bias-field head 510. In FIG. 5b, which shows the mechanism utilized in conventional duplication equipment having a horizontal configuration, blank copy tape 552 and mirror-master tape 554 are urged against transfer drum 550 by force of air clamp assembly 558. While held in intimate, slippage-free contact by the air clamp, the layers of tape are exposed to the anhysteretic transfer field from bias-field head 560.

Figure 6:
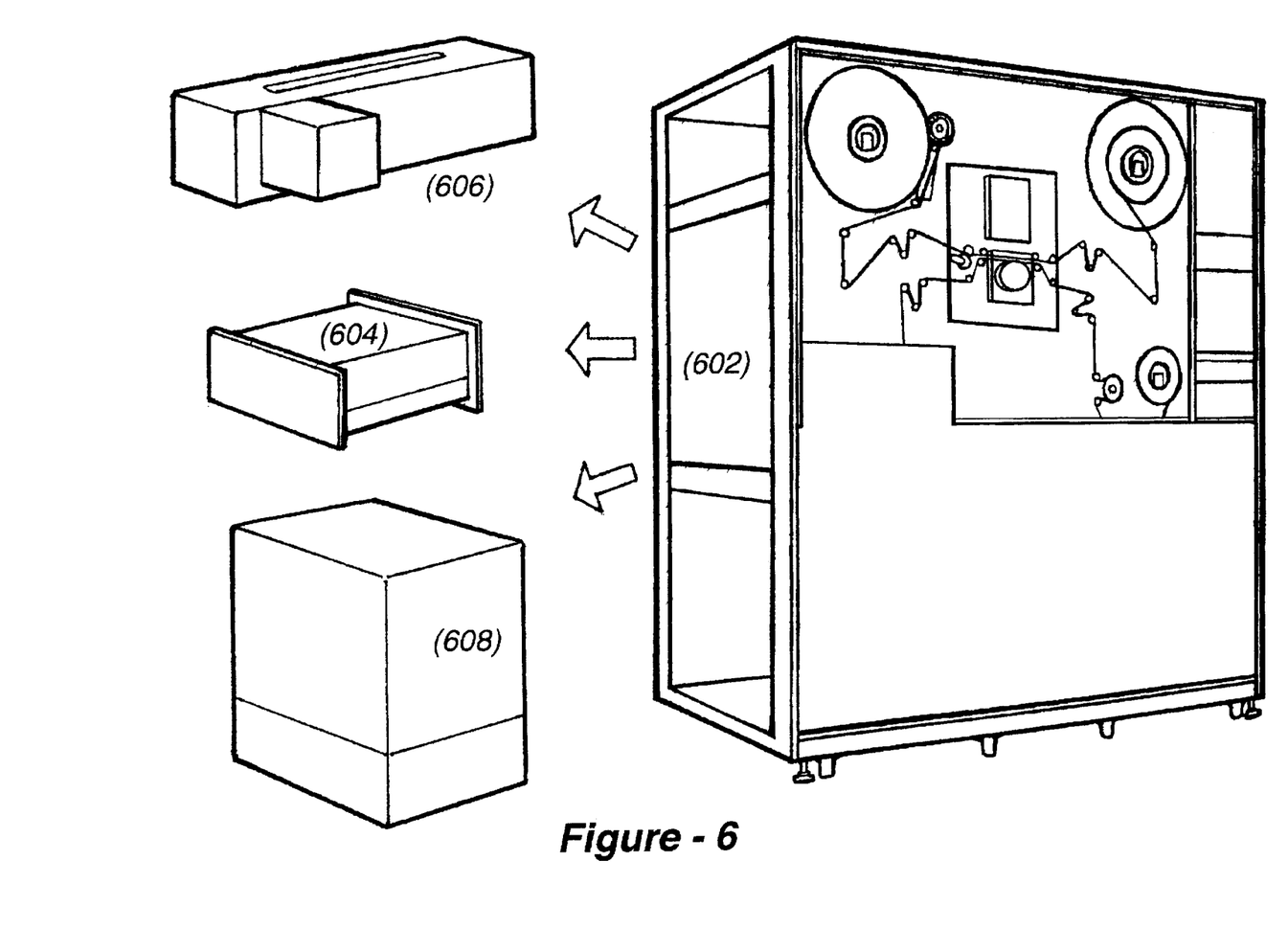
FIG. 6 shows the equipment removed from a thermal duplicator as part of the modifications in the subject invention.
Figure 7:
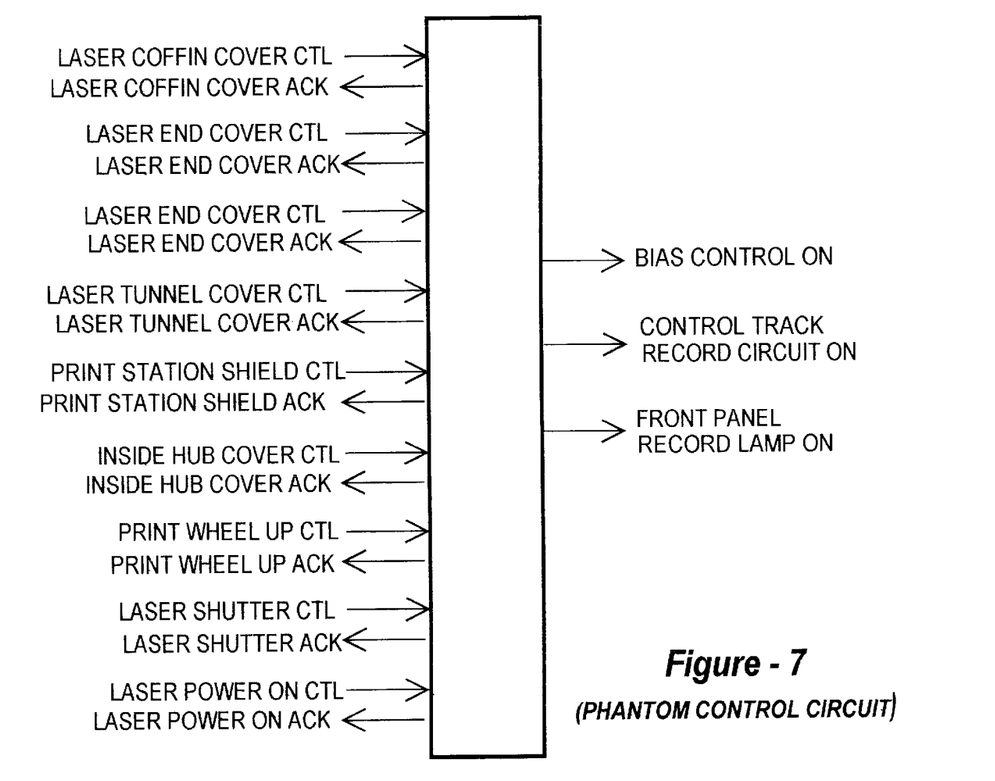
FIG. 7 shows the interrelationships of the various systems affected by a "phantom" circuit.

In order to create the improved magnetic-tape-duplication apparatus, Phase I of the process begins with the removal of the unneeded facilities from the thermoremanent tape duplication apparatus, as shown in FIG. 6. Step one involves the removal of tape heating facilities and attendant cooling provisions. Although a laser source is typically utilized to provide such heating, it is well within the scope of this invention to remove whatever heating/cooling means may have been employed. Assuming the use of a laser source, laser power supply 604 is removed from its mounting in apparatus frame 602. Step is two is to remove the laser feedback-control facilities 606, and step three is to remove the laser system water-cooling facilities 608. The removal of the laser head assembly is step four. All of these functional systems are interfaced with the duplication machine transport controller, which is implemented by way of a number of interrelated electronic feedback circuits. These servo-type circuits are utilized to control tape tension, laser intensity, tape speed and the like. In the conventional form of the duplication equipment, these circuits also perform the function of implementing a safety interlock system, for example, to prevent the opening of the laser head assembly while the laser is operating at power. To allow the duplication machine to function after these facilities have been removed, a special "phantom" circuit system has been developed which simulates the requisite control signals and safety interlock signals which are needed to allow operation of the transport in the absence of these facilities. In addition, this control system provides the necessary interface between the transport controller and the anhysteretic-duplication systems to be installed, as described with reference to FIG. 7.

As an alternative implementation, the entire duplication machine control system may be replaced with a PC-based controller, in which most functions are implemented through software-based direction. In most cases, commercially available interface cards are available to provide the necessary electrical interface signals to the remaining facilities and systems. Despite the higher cost of this implementation relative to the "phantom" method described above, there are many benefits to a PC/software implementation. For example, the PC-based implementation simplifies the inclusion of maintenance Logs for service scheduling (with automatic notification for the operator), advanced diagnostic information to ease troubleshooting and repairs, and customized "Help" functions to assist operators both in training and in normal usage. Further benefits include the ability, to produce detailed production logs and reports, manage master tape libraries and usage logs, and centralized management of multiple duplication machines through a system of network connections and monitoring computers.

Phase II of the conversion process involves the installation of those components which comprise the key facilities of the anhysteretic duplication machine. Because the transfer drum 206 of the thermoremanent duplication machine need not be constructed of any kind of magnetic material, it traditionally has been constructed from aluminum and aluminum alloys, to take advantage of their high thermal conductivity. In an anhysteretic transfer process, however, it is necessary to utilize a transfer drum constructed from magnetic materials. The greater the magnetic permeability of the transfer drum, the stronger the magnetic field will be in the transfer area, and the straighter the magnetic field lines will be. Therefore, the next step in the conversion process requires that the transfer drum be replaced with one constructed of steel and steel alloys. Special mounting brackets are fitted to the assembly to mount the new transfer drum and its air-bearing assembly onto the original transport.

The source of the magnetic field in this anhysteretic transfer process is the bias-field head assembly, which must be mounted in close proximity to the tape layers and the transfer drum. The air clamp assembly of the thermoremanent duplication machine has sufficient clearance to allow the introduction of a bias-field head assembly, however, custom mounting brackets must be fabricated to secure the bias field head assembly in the previously empty chamber within the air-clamp. A new bias oscillator circuit, power supply unit, and bias-field head record amplifier are all fitted to the modified duplication machine.

The anhysteretic-duplication method typically does not copy highly-saturated low-frequency signals without significant distortion to the waveform. Therefore, the usual method is to employ a re-recording head assembly for these types of signals. In typical usage today, the magnetic recordings copied on machines of this type are video programs, and these tapes have a control-track signal recorded along one edge of the tape. For this application, the re-recording head assembly usually is constructed so as to have the playback head gap and the record head gap separated by an integer multiple of the wavelength of the signal to be rerecorded. Special mounting apparatus are provided for this head assembly and the associated facilities, including a playback amplifier, a record amplifier, and a power supply unit.

Phase III concerns modifications to the loop-bin chamber which encloses the mirror-master tape storage area. In order to achieve high levels of productivity, it is necessary to utilize high speeds of tape transport, in excess of 6 meters per second. The original design utilized in the thermoremanent duplication machine suffers from problems due to static electricity build-up in the mirror master tape loop-bin chamber, which tends to limit the maximum transport speed which can be attained and the maximum length of mirror-master tape which may be confined within the loop-bin chamber. This problem is due, in part, to the materials utilized in construction of the mechanism. One side of the chamber is the lower part of the machine face-plate, which is constructed from thick aluminum plate. However, for durability and other reasons, this plate is anodized, thereby rendering the surface effectively non-conductive. The opposite side of the chamber consists of glass doors, which also are nonconductive. As a result, static build-up is a continual problem, due to the high-speed speed transport of the tape, and also due to the rubber-belt system located at the bottom edge of each of the three tiers of the chamber; these belts are included for the purpose of urging the mirror-master tape forward in the chamber, so as to prevent accumulation of bundles and tape jams.

To address the problem of static build-up, the traditional procedure is to spray a conductive film onto the surfaces of the glass doors, and wipe them dry with a soft cloth. However, this solution is not adequate, as it requires a high level of operator maintenance, and problems will still occur if the applications are not performed properly or with great enough frequency. One solution according to this invention is to remove all major components from the face-plate of the duplication machine, and chemically strip the anodized layer from the area of the loop-bin chamber. The face-plate is then reinstalled; and provided an electrical connection to the electrical grounding system of the duplication machine. In addition, the glass doors are replaced with doors comprised of glass having a thin, transparent, metallic, conductive layer on the side facing the loop-bin chamber. This layer is also connected to the electrical grounding system of the duplication machine, through a flexible electrically conductive strap. Thus, the mirror-master tape in the loop bin, chamber is now transported between two conductive panels, and no longer requires the continual operator attention of the conventional loop-bin chamber design. Alternative implementations may employ different methods of removing accumulated electrical charge from the loop-bin chamber, and these variations should be considered to be within the scope of the invention. One alternative example is the use of a conductive brush which physically contacts the tape.

The fourth phase of the conversion is the replacement of the conventional pinch-roller on the mirror-master tape drive with one which causes less adhesion to the tape oxide surface. While the existing pinch-roller is suitable for the mirror-master tape of the type employed for the conventional thermoremanent duplication machine, the anhysteretic process requires the use of extremely high coercivity mirror-master tapes. These tapes have a coercivity of over 2000 Oersted, and during testing proved to be too susceptible to damage when utilizing the conventional pinch-rollers.

The fifth phase of the conversion involves compensation for skew errors in helically scanned copy tapes, which errors are introduced due to the differences in thickness of the standard high-coercivity mirror-master tapes. This is solved by adjusting the tension of both the copy tape and the mirror-master tape. Each tape is adjusted on both the supply side and also the take-up side of the transfer drum contact area.

The sixth phase is the conversion of the mirror-master recording machine. In order to record the higher-coercivity mirror-master tapes required by the anhysteretic duplication process, it is necessary to replace the record heads of the video recorder normally used with the conventional thermoremanent duplication system. These heads must be capable of recording on mirror-master tapes having a coercivity of more than 2000 Oersteds. In addition, the record drive amplifiers of the machines are replaced with new circuitry, and the bias oscillators suitably readjusted.

Having described our invention, we claim:

1. A method of modifying a high-speed, thermomagnetic tape duplicator having heating source and related cooling components, a non-magnetic transfer drum assembly, and a master and copy tape transport mechanism with control electronics into a machine capable of performing tape duplication based upon the anhysteretic process, the method comprising the steps of:

removing the heating source and related cooling components from the thermomagnetic tape duplicator;

replacing the non-magnetic transfer drum assembly of the thermomagnetic tape duplicator with a magnetizable counterpart; and installing a bias-field magnetic head and associated control electronics which, in cooperation with the magnetizable transfer drum assembly, are capable of performing anhysteretic tape duplication using the master and copy tape transport mechanism remaining in the thermomagnetic tape duplicator.

2. A high-speed anhysteretic tape duplicator resulting from the modifications according to claim 1.

3. The method of claim 1, further including the step of:
installing a mechanism to correct for copy tape tension errors.

4. The method of claim 1, further including the step of:
replacing the transport control electronics with a computer-based controller capable of performing a plurality of production reporting functions.

5. The method of claim 1, wherein the high-speed magnetic tape duplication equipment is provided with a master-tape loop-bin chamber, the method further including the step of:

modifying the master-tape loop-bin chamber with an electrically conductive element operative to reduce static build-up.

6. The method of claim 1, further including the step of:
installing a phantom control circuit which generates electrical signals needed to operate the master and copy tape transports in the absence of the heating and related cooling components.

7. A method of producing improved high-speed magnetic tape duplication apparatus, comprising the steps of:

providing high-speed magnetic tape duplication equipment based upon the thermomagnetic duplication process, the equipment including:

laser heating and related cooling components, a non-magnetic transfer drum assembly, a master and copy tape transport mechanism and associated control electronics, and a master-tape loop-bin chamber;

removing the laser heating and related cooling components;

replacing the non-magnetic transfer drum assembly with a a magnetizable counterpart; and installing a bias-field magnetic head and associated control electronics which, in cooperation with the magnetizable transfer drum assembly, are capable of performing anhysteretic tape duplication using the master and copy tape transport mechanism and master-tape loop-bin chamber remaining in the equipment as provided.

8. A high-speed anhysteretic tape duplicator resulting from the modifications according to claim 7.

9. The method of claim 7, further including the step of:

installing a mechanism to correct for copy tape tension errors.

10. The method of claim 7, further including the step of:

replacing the transport control electronics with a computer-based controller capable of performing a range of production reporting functions.

11. The method of claim 7, further including the step of:

modifying the master-tape loop-bin chamber to include an electrically conductive element operative to reduce static build-up.

12. The method of claim 7, further including the step of:

installing a phantom control circuit which generates electrical signals needed to operate the master and copy tape transports in the absence of the laser heating and related cooling components.

* * * * *

UNITED STATES PATENT AND TRADEMARK OFFICE
CERTIFICATE OF CORRECTION

PATENT NO. : 5,923,484
DATED : July 13, 1999
INVENTOR(S) : Kiny Washino

It is certified that error appears in the above-identified patent and that said Letters Patent is hereby corrected as shown below:

Column 6, line 26, change "removing" to --disabling--.

Column 7, line 2, change "removing" to --disabling--.

Signed and Sealed this

Twelfth Day of December, 2000

Attest:

Q. TODD DICKINSON

*Attesting Officer*  *Director of Patents and Trademarks*

UNITED STATES PATENT AND TRADEMARK OFFICE
CERTIFICATE OF CORRECTION

PATENT NO. : 5,923,484

DATED : July 13, 1999

INVENTOR(S) : Kinya Washino, et al.

It is certified that error appears in the above-identified patent and that said Letters Patent is hereby corrected as shown below:

Column 6, line 26, change "removing" to --disabling--.

Column 7, line 2, change "removing" to --disabling--.

This certificate supercedes certificate of correction issued December 12, 2000.

Signed and Sealed this

Sixth Day of February, 2001

Attest:

Attesting Officer

Q. TODD DICKINSON

Director of Patents and Trademarks